Aug. 16, 1966  P. B. WAHLSTROM ET AL  3,266,414
CALENDERS TO OVERCOME BARRING

Filed May 29, 1963  3 Sheets-Sheet 1

INVENTORS:
PER BÖRJE WAHLSTRÖM
KARL-OLOF LARSSON
BY
THEIR ATTORNEYS

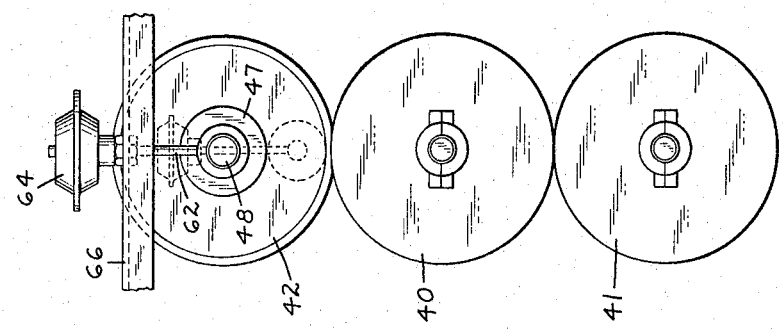
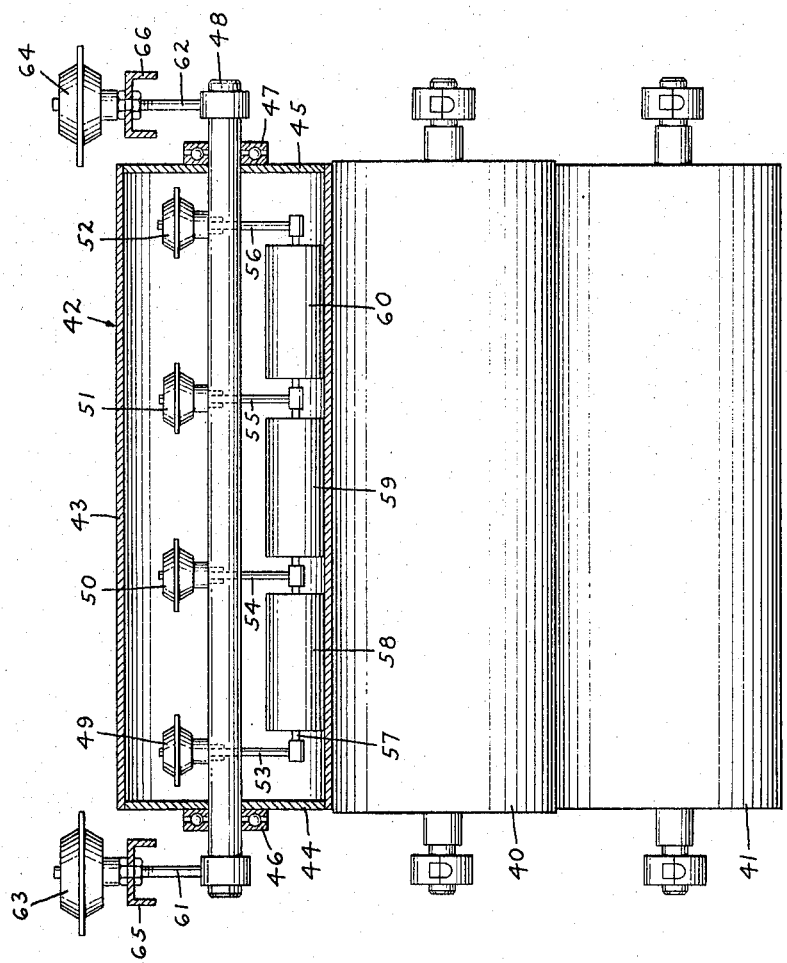

FIG.6.
FIG.5.
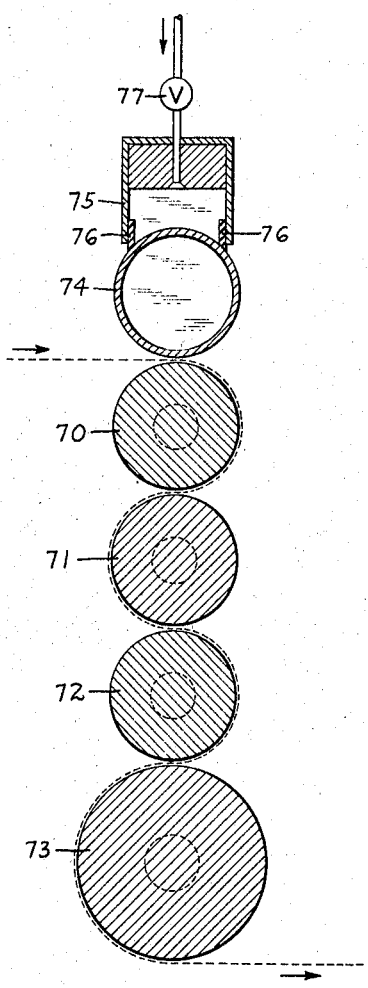
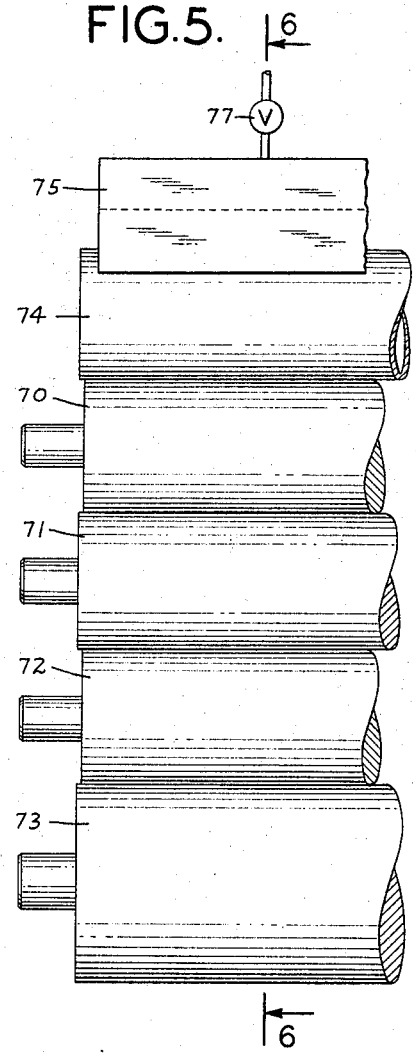
INVENTORS:
PER BÖRJE WAHLSTRÖM
KARL-OLOF LARSSON
THEIR ATTORNEYS

# United States Patent Office 3,266,414
Patented August 16, 1966

3,266,414
CALENDERS TO OVERCOME BARRING
Per Borje Wahlstrom and Karl-Olof Larsson, Karlstad, Sweden, assignors to Aktiebolaget Karlstads Mekaniska, Werkstad, Karlstad, Sweden, a company of Sweden
Filed May 29, 1963, Ser. No. 284,077
Claims priority, application Sweden, May 30, 1962, 6,098/62, 6,105/62; Sept. 3, 1962, 9,504/62
9 Claims. (Cl. 100—163)

This invention relates to improvements in paper calenders and it relates more particularly to paper calenders for use with high speed paper-making machines and by means of which calender barring is eliminated or substantially reduced.

Calender barring is a periodic variation in the thickness and surface smoothness of the paper leaving a machine calender. Barring occurs above a certain speed in high speed machine calenders and is a serious problem for newsprint and other paper manufacturers as it effects the printing quality of the sheet and can also cause difficulty with the running of the paper in the printing presses by causing paper breaks.

The barring pattern or variation in the thickness of caliper of the paper has rather constant wave lengths. Normally two distinct wave lengths can be distinguished, the longer wave length varying between 70 and 170 millimeters and the shorter wave length between 15 and 30 millimeters. The larger wave length barring is not as noticeable as the shorter wave length barring although the variation in the caliper (thickness) of the sheet may be the same.

Small variations in calender speed, moisture content and so forth do not change the wave length of the long wave barring greatly but can completely change the wave length of the short wave barring.

Inasmuch as calender barring is most undesirable, many suggestions have been made as to its probable cause. For example, others have suggested that the wet end of the paper machine may be a source of calender barring. Also, geometrical and surface hardness patterns in the rolls have been discussed as a possible source. Investigation of these possible sources of barring has shown that they contribute little, if any, to barring. Moreover, investigation of the metallurgy of the rolls, roll grinding faults, crown curve of the rolls, work hardening and flat lines on the rolls, bearings, drive variations, roll balance and so forth have not been shown to be the cause of a barring pattern or wave length of the constancy which has been observed in paper calendered in high speed calenders.

It occurred to us that calender barring might arise for the reason that a calender is a resonant system composed of masses connected with springs. In such a system, the rolls are the masses and the paper is the springs.

If paper is fed through a stack with heavy massive rolls and if there are no outside disturbances, vibrations due to the natural frequencies in the stack would die rather quickly because of the viscoelastic properties of the paper. However, paper passing through a nip with varying caliper due to differences in compression at an earlier nip will cause a varying nip pressure. This variation is fed through the massive rolls in the stack to the remainder of the nips and is the cause of nip pressure variations and roll movements with new compressional variations as a consequence. Thus the stack acts as a mechanical oscillator with the running paper as feed back and with the drive roll giving the energy necessary to keep the oscillations alive. It is well known that the frequency of an oscillator adjusts itself to make the feed back fit the generated oscillation as well as possible and as close as possible to a natural frequency of the system. This means that for each possible oscillation frequency there will be a certain number (no integer) of waves between each pair of nips. If the machine speed is increased the frequency of the stable oscillation will increase to keep the number of waves between two adjacent nips constant until the frequency corresponding to this number minus one will be closer to the natural frequency of the system. At this speed the wave length will increase discontinuously to a new stable wave length. It is understandable that the oscillation frequencies giving the longest waves will be more stable for small variations in machine speed and paper quality than the oscillations giving shorter waves.

A comparison of the wave lengths of the barring pattern with the wave lengths of the vibration of the calender at different machine speeds has shown a remarkable similarity. From these observations, we have determined that the barring pattern in the paper is caused by vertical vibrations of the calender rolls in the stack and that the stack works as a mechanical oscillator needing no outside disturbance to produce barring. The paper transfers forces from nip to nip and acts as the feed back. The energy is introduced by the drive. The vertical vibrations of the rolls have been found to produce accelerations, which in the case of the top roll, may vary between —1 g. and 5 g. As a result, the paper leaving the calender may vary in thickness in a repetitive pattern as much as plus or minus 10% or even more.

On the basis of our discovery of the cause of calender barring, we have, in accordance with the present invention, provided calenders in which the vibrations are dissipated or are neutralized, thereby preventing the barring of the paper even at the high speeds involved in high speed newsprint calenders, e.g., 1800 to 2200 feet per minute and higher.

More particularly, in accordance with a preferred form of the present invention, the heavy top roll of a calender may be replaced with a relatively light roll which is held under a uniform resilient pressure against the second roll of the calender by elastic or resilient means such as, for example, air pressure so that paper entering the nip between these rolls will be compressed substantially uniformly and its tendency to set up vibration and act as a feed back source in the rolls lower in the stack will be minimized. Even if some vibration is set up in the stack, the lightweight top roll can follow, without bouncing, the vibrations of the second roll which is vibrated by lower rolls. Similarly, the heavy top roll of a calender may be provided with air pressure means for forcing it against a subjacent roll with increased pressure to reduce bouncing of the top roll and to compress the web to a greater extent and thereby suppress its tendency to induce and maintain vibration in the calender stack.

For a better understanding of the present invention reference may be had to the accompanying drawings in which FIGURE 1 is a side elevational and partial sectional view of three rolls of a calender embodying the present invention;

FIGURE 3 is a front elevational and partial sectional view of modified form of a calender embodying the present invention;

FIGURE 4 is an end elevational view of the calender of FIGURE 3;

FIGURE 5 is a schematic front elevational view and partially broken away of a modified type of calender embodying the present invention, and FIGURE 6 is a view in section taken on line 6—6 of FIGURE 5.

In the forms of the invention illustrated in FIGURES 1–6, substantial variation in the nip pressure in the first nip is prevented so that the paper web does not set up substantial vibrations in the second and following nips which can be transmitted back to the first nip to create pressure differences causing barring of the web. In order to achieve these results, the embodiment of the invention shown in FIGURES 1–6 makes use of a top roll of a light weight, for example, between about ½ and 1/20 of the weight of the usual heavy top roll, and a pressure device arranged along the top roll which exerts an elastic pressure distributed over the entire length of the roll, this pressure being higher than the pressure of gravity to provide an even and high nip pressure between the top roll and the underlying and cooperating roll. In this manner the mass which has to be moved by thickness variation in the paper web passing through the nip is reduced and it is possible to maintain a large and constant nip pressure. Impacts and vibrations from the underlying rolls in the calender stack do not cause any considerable corresponding variations in the nip pressure in the first nip so that the tendency for the paper web to create a "feed back" condition cannot cause any harm. The paper web will, therefore, in the first nip be given an even compression and reduced to a substantially uniform thickness. While passing through the following nips, the precompressed web will have considerably reduced tendencies toward variations in thickness and inducing vibration in the calender stack.

Figure 1:
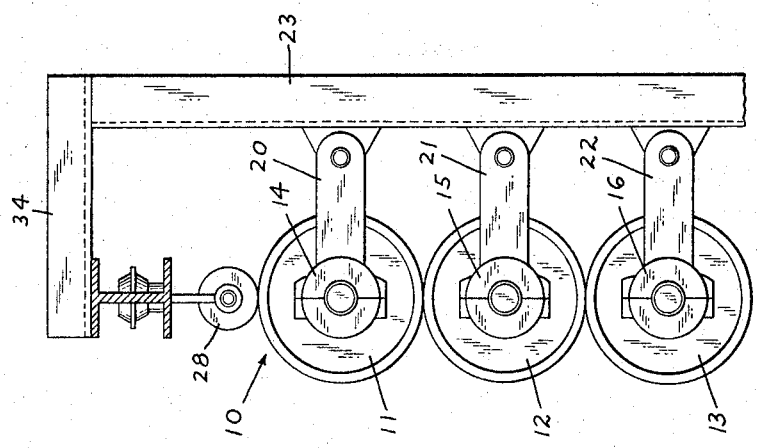
Figure 2:
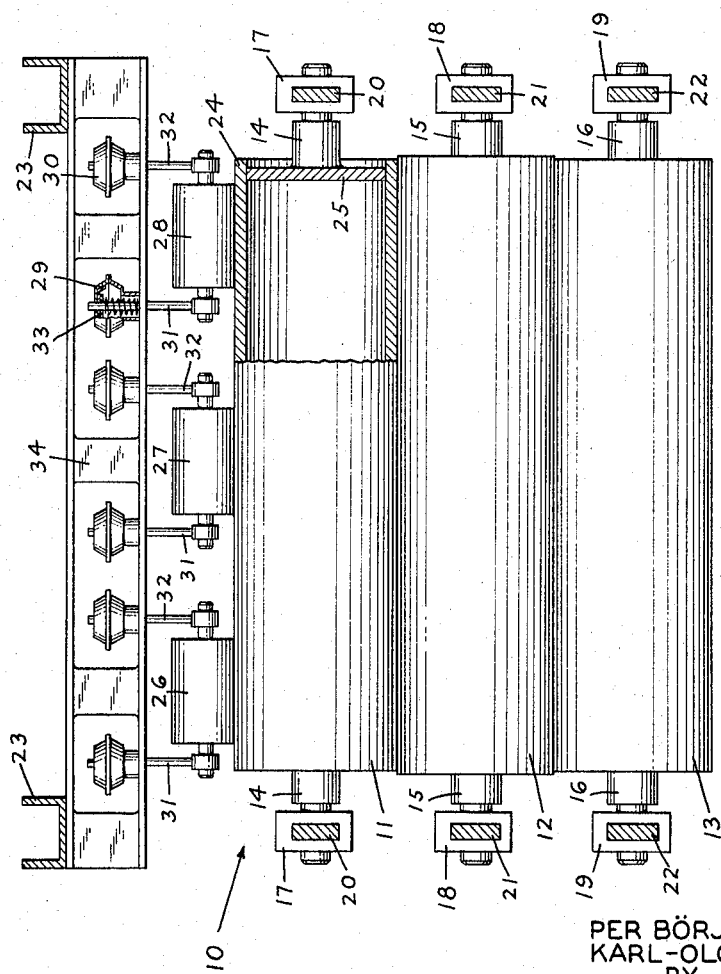
FIGURE 2 is a front elevational view partially broken away of the calender.

Referring first to FIGURE 1 and 2, a portion of a calender 10 is shown therein and induces a top roll 11 and two lower rolls 12 and 13. While only three rolls are shown, it will be understood that more than this number of rolls may be provided in a calender stack, for example, 6 or 8 rolls. The rolls have shafts 14, 15 and 16 at each end respectively mounted in bearings 17, 18 and 19, the bearings being supported on pivoted arms 20, 21 and 22 carried by the frame 23 of the calender. Other arrangements of the bearing mounts of the rolls can be provided in well known ways.

The rolls 12, 13 and any other underlying rolls may be of steel and may be cylindrical or crowned as may be required depending upon their weight, length and other characteristics. In typical calenders, these rolls may be as long as 264 inches or even longer and have diameters between about 10 and 20 inches.

In accordance with the invention, the upper roll 11 is of hollow formation having a lightweight outer shell 24 formed for example of steel plate about ½ to 1 inch thick and having end plates 25 at its opposite ends each carrying a stub shaft 14 which is received in a bearing at the end of the roll. The roll 11 need not be crowned. The weight of a typical roll 11 in a 264 inch calender is about 2000 pounds as compared with a weight of about 20000 pounds for a conventional top roll similar to the rolls 12 and 13. The weight of the roll 11 will, of course, depend on its size and may be such that it applies nip pressure of about 5 to 30 pounds per lineal inch at the nip. In accordance with the invention, a plurality of pressure rolls 26, 27, 28 engage the top of the roll 11 along its length and each of these rolls is forced downwardly by means of an air pressure device such as the air cylinders 29 and 30. Each pair of air cylinders includes rods 31 and 32 connected to diaphragms 33 in the cylinders. By applying air pressure to the cylinders above the diaphragms 33, the rods 31 and 32 are forced downwardly pressing a roll, e.g., roller 28 against the top of the roll. In the same way, the rolls 26 and 27 are forced with equal pressure against the top of the roll 11. The rolls 26, 27 and 28 may be covered with rubber or the like to avoid marring the roll 11. All of the air cylinders may be mounted on a cross beam 34 above and parallel with the roll 11 and fixed at its ends to the frame 23.

In a typical operation, the air pressure applied to the diaphragms 33 of the air cylinders forces the roll 11 downwardly against the roll 12 with a nip pressure between 30 and 125 pounds per lineal inch along the nip. The weight of the top roll 11 and the pressure rolls 26, 27 and 28 typically may apply a nip pressure of 10 pounds per lineal inch. The combined air and roll pressure at the nip may, however, be larger or smaller depending on the amount of web compression sought.

The paper web being calendered is successively passed through the nip between the rolls 11 and 12 and the nip between the rolls 12 and 13 and through the nips of successively lower rolls, if present. When the thickness of the web varies, the vertically movable rolls 12 and 13 move up and down respectively and their nip pressure will vary due to the forces of the inertia of the rolls. The nip pressure between the rolls 11 and 12 will, however, vary comparatively little because the roll 11 and the pressure rolls 26, 27 and 28 have comparatively small masses and because the nip pressure depends mainly on elastic forces. The elastic support for the roll 11 is such that the elastic forces will remain constant or will have very little variation because of vertical movements of the roll 11 caused by normal unevenness of the web. This further contributes to the maintenance of the constant nip pressure between the rolls 11 and 12 so that the web will be evenly compressed. Any remaining unevennesses causing vertical movement of the roll 12 when passing between the solid rolls 12 and 13 do not influence the nip between rolls 11 and 12 because the roll 11, due to its light weight easily follows the movements of the roller 12. Further reduction of variation in the nip pressure may be obtained by making the shell 24 of the roll 11 somewhat flexible, that is, by making it of thinner sheet material, e.g., between ⅜ and ¾ inches thick so that the shell absorbs and dissipates some of the motion transmitted from the lower rolls. Also, as explained in greater detail hereinafter, the other rolls of the calender, or some of them, may be somewhat resilient so that vibrations due to the passage of the web between the rolls and the frequency of the stack are dissipated to a very substantial extent.

While the form of the invention illustrated in FIGURES 1 and 2 shows three pressure rollers 26, 27 and 28, it will be understood that this number may be varied considerably and will depend in part upon the length of the roll 11 and other rolls in the stack as well as the design requirements for the pressure applying motors to obtain an even distribution of pressure along the length of the roll 11. For example, with a roll 11 of a length of 264 inches, seven pressure rolls, each about 20 inches or four each about 40 inches in length can apply a pressure uniformly along the nip between the rolls 11 and 12.

The structure of the means for applying pressure at the first nip can be modified as shown for example in FIGURES 3 and 4. Three rolls of a calender stack are illustrated in FIGURES 3 and 4 but it will be understood that the stack may have a greater number of rolls as indicated above. The lower rolls 40 and 41, as illustrated, are solid or thick shelled and they may be crowned or uncrowned as may be necessary depending upon their length and other factors well known in the art. The top roll 42 is hollow and includes a lightweight shell 43 having fixed end plates 44 and 45 provided with bearings 46 and 47 through which extends a shaft 48 carrying the pressure applying air cylinders 49, 50, 51 and 52 which are connected by means of the push rods 53, 54, 55 and 56 to the shaft 57 on which the pressure applying rollers 58, 59 and 60 are mounted. Also, the ends of the shaft 48 are connected to push rods 61 and 62 of the air cylinders 63 and 64 which are mounted on portions 65 and 66 of the frame of the calender. In this way, air pressure supplied to the cylinders 63 and 64 forces downwardly the shaft 48 on which the roller 42 is mounted to increase the nip pressure between the rolls 40 and 42. Air is supplied through an appropriate passage in the shaft 48 to the cylinders 49, 50, 51 and 52 and causes the rolls 58, 59 and 60 to apply pressure to the lower portion of the roller at the zone of the nip between it and the roller 40. In this way, the roller 42 is pressed resiliently against the roller 40 and the pressure rollers 58, 59 and 60 also distribute a pressure uniformly along the length of the shell 43 of the roller 42 at the nip. Here again, the pressure per lineal inch at the nip can be varied by the air pressure cylinders 63 and 64 and the weight of the roll 43 and associated structure so as to assure the desired compression of the web passing through the nip between the rollers 40 and 42 and through the nip between the rollers 40 and 41.

Another embodiment of the means for applying pressure to a lightweight top roll is shown in FIGURES 5 and 6. In this calender, four solid or thick shell rolls 70, 71, 72 and 73 are arranged in a stack below a hollow lightweight top roll 74. The desired nip pressure between the rolls 70 and 74 is provided by means of an air box 75 which is mounted above the top roll 74 and is maintained in substantially air-tight engagement therewith by means of flexible seals 76. Compressed air is supplied to the air box 75 through the valve 77 to maintain a nip pressure of a desired magnitude, such as that described above, between the hollow roll 74 and the second roll 70 forming the first nip to which the paper web is fed.

Other modifications of the elastic pressure applying means for urging the lightweight roll downwardly to regulate and maintain nip pressure may be used.

It will be understood that the nip pressure of the top rolls shown in FIGURES 3 to 6 without air pressure, will be similar to the nip pressure of the top roll shown in FIGURES 1 and 2 and the air pressures applied to the rolls also will be similar. However, inasmuch as the pressure rolls 58, 59 and 60 of FIGURES 3 and 4 bear against the shell 43 at the nip zone, somewhat higher air pressure may be applied, for example between about 25 and 250 pounds per lineal inch without substantial deformation of the roll 42.

From the foregoing, it will be apparent that apparatus has been provided which is effective in preventing calender barring in calenders which are operated at speeds of 2,000 feet per minute and even higher. Also, they are useful in lower speed machines, thus successfully solving the problem of preventing barring of paper during calendering.

It will be understood that the embodiments of the invention described above are illustrative and that other modifications and variations may be made without departing from the invention. The invention, accordingly is limited only as defined by the following claims.

We claim:

1. In a paper calendering machine having a stack of at least two calendering rolls in vertical superimposed relation, means supporting said rolls for rotation and up and down movements, said rolls forming a plurality of nips there-between through which a paper web is passed to calender it, said web having plastic properties so that variations in thickness lengthwise the web caused in one of said nips are fed to the next nip causing force variations on the rolls in said stack and creating and maintaining self excited vibrations characterized by up and down movement between at least two of the rolls in said stack and consequent barring of said web, the combination therewith of means for reducing said self excited vibration comprising a light weight, substantially hollow roll above the top roll of said stack and forming a nip therebetween, means engaging said light weight roll throughout substantially its entire length, gas pressure means operatively connected with the means engaging the light weight roll for resiliently biasing said light weight roll toward said top roll in said stack to maintain a constant pressure between at least said light weight roll and said top roll to produce a compressed web of lengthwise constant thickness leaving said nip therebetween, said constant web thickness reducing initiation and maintenance of self excited vibrations in said stack and reducing barring of the paper web.

2. The paper calendering machine set forth in claim 1 in which said means engaging said light weight roll comprises a fixedly mounted box in substantially airtight and relatively movable relation to said light weight a connection for roll, and said gas pressure means comprises supplying gas under pressure to said box to force said light weight roll against said top roll.

3. In a paper calendering machine having a stack of at least two calendering rolls in vertical superimposed relation, means supporting said rolls for rotation and up and down movements, said rolls forming a plurality of nips therebetween through which a paper web is passed to calender it, said web having plastic properties so that variations in thickness lengthwise the web caused in one of said nips are fed to the next nip causing force variations on the rolls in said stack and creating and maintaining self excited vibrations characterized by up and down movement between at least two of the rolls in said stack and consequent barring of said web, the combination therewith of means for reducing said self excited vibration comprising a lightweight, substantially hollow roll above the top roll of said stack and forming a nip therebetween, a plurality of pressure rolls extending lengthwise of said lightweight roll and engaging said lightweight roll throughout substantially its entire length, a plurality of gas cylinders forcing said pressure rolls against said lightweight roll with substantially uniform pressure for resiliently biasing said lightweight roll toward the top roll in said stack to maintain a constant pressure between at least said lightweight roll and said top roll to produce a compressed web of lengthwise constant thickness leaving said nip therebetween, said constant web thickness reducing initiation and maintenance of self excited vibrations in said stack and reducing barring of the paper web.

4. The paper calendering machine set forth in claim 3 in which said lightweight roll camprises a thin resilient outer shell.

5. In a paper calendering machine having a stack of at least two calendering rolls in vertical superimposed relation, means supporting said rolls for rotation and up and down movements, said rolls forming a plurality of nips therebetween through which a paper web is passed to calender it, said web having plastic properties so that variation in thickness lengthwise the web caused in one of said nips are fed to the next nip causing force variations on the rolls in said stack and creating and maintaining self excited vibrations characterized by up and down movement between at least two of the rolls in said stack and consequent barring of said web, the combination therewith of means for reducing said self excited vibration comprising a lightweight, substantially hollow roll above the top roll of said stack and forming a nip therebetween, a plurality of pressure rollers within said lightweight roll and engaging it throughout substantially its entire length adjacent to the nip between it and said top roll, gas cylinders within said lightweight roll urging said pressure rolls against the interior of said lightweight roll with substantially equal pressure and gas cylinders mounting said lightweight roll for rotation and urging it against said top roll, said gas cylinders resiliently biasing said lightweight roll toward the top roll 'n said stack to maintain a constant pressure between at east said lightweight roll and said top roll to produce a compressed web of lengthwise constant thickness leaving said nip therebetween, said constant web thickness reducing initiation and maintenance of self excited vibrations in said stack and reducing barring of the paper web.

6. In a paper calendering machine having a stack of `: least two calendering rolls in vertical superimposed relation, means supporting said rolls for rotation and up and down movements, said rolls forming a plurality of nips therebetween through which a paper web is passed to calender it, said web having plastic properties so that variations in thickness lengthwise the web caused in one of said nips are fed to the next nip causing force variations on the rolls in said stack and creating and maintaining self excited vibrations characterized by up and down movement between at least two of the rolls in said stack and consequent barring of said web, the combination therewith of means for reducing said self excited vibration comprising a lightweight, substantially hollow roll above the top roll of said stack and forming a nip therebetween, said lightweight roll having a weight sufficient to exert a nip pressure between about 10 and 80 pounds per lineal inch along the nip, means engaging said lightweight roll throughout substantially its entire length, gas pressure means operatively connected with the means engaging the lightweight roll for resiliently biasing said lightweight roll against the top roll in said stack, said gas pressure means containing gas under pressure for biasing said lightweight roll against said top roll with the force of between about 2 and 10 times said nip pressure of said lightweight roll to maintain a constant pressure between at least the said lightweight roll and said top roll to produce a compressed web of lengthwise constant thickness leaving said nip therebetween, said constant web thickness reducing initiation and maintenance of self excited vibrations in said stack and reducing barring of the paper web.

7. The paper calendering machine set forth in claim 6 in which said means engaging said lightweight rolls comprises a plurality of pressure rolls extending lengthwise of said lightweight roll in engagement therewith and said gas pressure means comprises a plurality of gas cylinders forcing said pressure rolls against said lightweight roll with substantially uniform pressure.

8. The paper calendering machine set forth in claim 6 in which said means engaging said light weight roll comprises a fixedly mounted box in substantially airtight and relatively movable relation to said light weight roll, and said gas pressure means comprises a connection for supplying gas under pressure to said box to force said light weight roll against said top roll.

9. In a paper calendering machine having a stack of at least two calendering rolls in vertical superimposed relation, means supporting said rolls for rotation and up and down movements, said rolls forming a plurality of nips therebetween through which a paper web is passed to calender it, said web having plastic properties so that variations in thickness lengthwise the web caused in one of said nips are fed to the next nip causing force variations on the rolls in said stack and creating and maintaining self excited vibrations characterized by up and down movement between at least two of the rolls in said stack and consequent barring of said web, the combination therewith of means for reducing said self excited vibration comprising a lightweight, substantially hollow roll above the top roll of said stack and forming a nip therebetween, said lightweight roll having a weight sufficient to exert a nip pressure of between about 5 and 30 pounds per lineal inch, means engaging said lightweight roll throughout substantially its entire length, gas pressure means operatively connected with the means engaging the lightweight roll for resiliently biasing said lightweight roll against the top roll in said stack, said gas pressure means containing gas under pressure for urging said lightweight roll against said top roll with a nip pressure between about 25 and 250 pounds per lineal inch to maintain a constant pressure between at least the said lightweight roll and said top roll to produce a compressed web of lengthwise constant thickness leaving said nip therebetween, said constant web thickness reducing initiation and maintenance of self excited vibrations in said stack and reducing barring of the paper web.

References Cited by the Examiner
UNITED STATES PATENTS

| | | | |
|---|---|---|---|
| 2,395,915 | 3/1946 | Specht | 100—155 |
| 2,950,507 | 8/1960 | Keyser. | |
| 3,043,211 | 7/1962 | Appenzeller | 100—170 |
| 3,060,843 | 10/1962 | Moore et al. | 100—41 |
| 3,111,894 | 11/1963 | Murray | 100—162 |
| 3,119,324 | 1/1964 | Justus | 100—170 |
| 3,120,174 | 2/1964 | Ainsworth | 100—170 |

FOREIGN PATENTS

| | | |
|---|---|---|
| 590,181 | 6/1960 | Canada. |
| 152,232 | 2/1962 | Russia. |

OTHER REFERENCES

German printed application, Pickartz No. R 14124 V11/8b, Feb. 16, 1956.

LOUIS O. MAASSEL, *Primary Examiner.*

WALTER SCHEEL, *Examiner.*

UNITED STATES PATENT OFFICE
CERTIFICATE OF CORRECTION

Patent No. 3,266,414                                    August 16, 1966

Per Borje Wahlstrom et al.

It is hereby certified that error appears in the above numbered patent requiring correction and that the said Letters Patent should read as corrected below.

Column 3, line 31, for "induces" read -- includes --; column 6, line 9, strike out "a connection for" and insert the same before "supplying" in line 10, same column 6; line 67, for "east" read -- least --.

Signed and sealed this 22nd day of August 1967.

(SEAL)
Attest:

ERNEST W. SWIDER                                              EDWARD J. BRENNER
Attesting Officer                                                  Commissioner of Patents